March 20, 1962
H. HARDY
3,025,568
MEANS FOR CONTROLLING OR DETERMINING THE FILLING
OF MOULDS IN INJECTION MOULDING
Filed Sept. 29, 1959
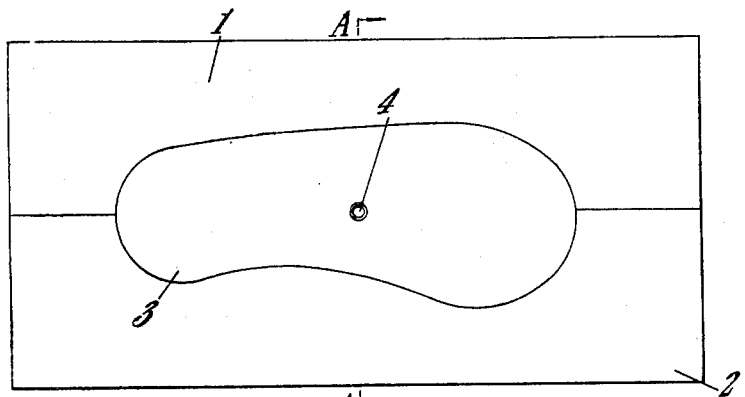
*Fig. 1.*
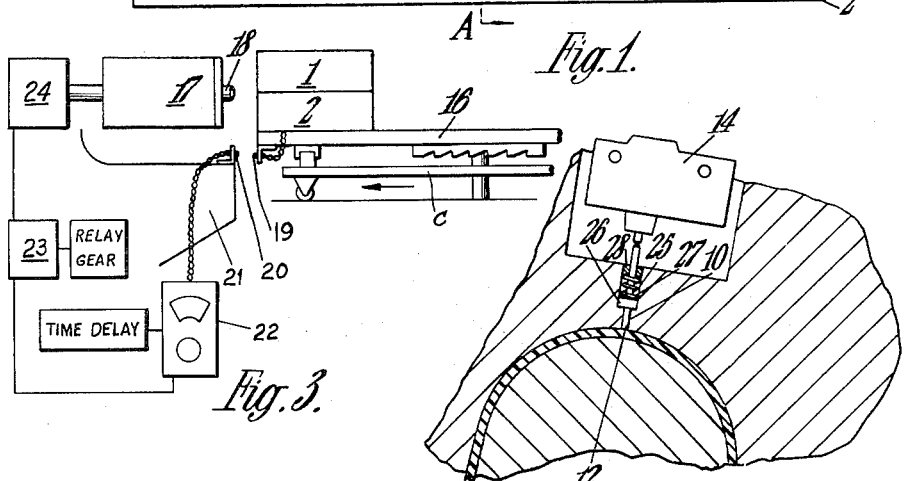
*Fig. 3.*
*Fig. 4.*
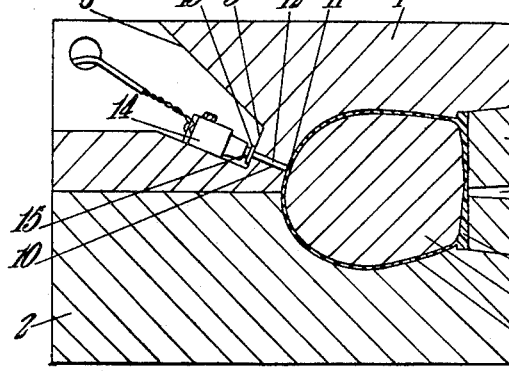
*Fig. 2.*
Inventor
H. Hardy
By Glascock Downing Seebold
Attys.

United States Patent Office 3,025,568
Patented Mar. 20, 1962

3,025,568
MEANS FOR CONTROLLLING OR DETERMINING THE FILLING OF MOULDS IN INJECTION MOULDING
Henry Hardy, Boston, Mass., assignor to Foster Yates & Thom Limited, Blackburn, England, and International Vulcanizing Corp., Boston, Mass.
Filed Sept. 29, 1959, Ser. No. 843,264
Claims priority, application Great Britain Oct. 9, 1958
5 Claims. (Cl. 18—30)

This invention relates to the injection moulding of plastic materials and may be applied with particular advantage to moulds of the type which are held closed by mechanical securing means such as latches or locking devices, but not restricted to such moulds. For the production of a satisfactory moulded article it is essential that the time during which injection takes place is appropriate having regard to all the conditions which affect mould filling so that the mould is completely filled. It is also important that this time should not exceed that required for complete filling since otherwise the injection pressure is liable to cause extrusion of material at the joints as by springing open of the mould parts. It is the object of the present invention to provide means for obviating this possibility by controlling or determining the filling of the mould.

According to the invention an apparatus for injection moulding of plastic materials includes a pressure responsive means located in the mould cavity, and means controlled by said pressure responsive means for interrupting the injection of material when or after the mould has been completely filled. Preferably, or according to a further feature of the invention the said pressure responsive means is located at or in the vicinity of that region of the cavity which is the last to be filled during the moulding operation.

In one preferred construction according to the invention a displaceable member such as a pin is located in a bore extending through the mould wall from the cavity or said region thereof and is adapted to be displaced by pressure of the material in the completely filled cavity to actuate an electrical switch, preferably a micro switch, for controlling a circuit including suitable means for interrupting operation of the injection mechanism. Preferably or if desired the controlling circuit includes a time delay device which may be adjustable and is adapted to provide a desired interval between the closing of the switch and the stopping of the injection.

In one construction according to the invention in which provision is made for relative motion to take place between the injection mechanism or cylinder and the mould for the purpose of effecting engagement between the injection nozzle and the mould orifice, the above mentioned controlling circuit includes switch contacts which are closed when the injection nozzle and mould are moved together or engaged.

The stopping of the injection mechanism may be effected by suitable relay or contactor devices.

It will be understood that the appropriate region in the mould for the pressure responsive means may be conveniently determined by experiment. Also two or more pressure responsive means may be provided in certain circumstances.

The invention will be better understood from the following examples.

In the accompanying drawing:

FIGURE 1 is a side view of a mould provided with control means in accordance with the invention;

FIGURE 2 is a cross section of FIGURE 1 on the line A—A showing the pressure responsive device;

FIGURE 3 is a diagram of the control system for an injection moulding apparatus;

FIGURE 4 is a section showing an alternative form of the pressure responsive pin.

In carrying the invention into effect according to one convenient mode, as applied by way of example to the injection moulding of a shoe or sandal in plastic material as illustrated in the figures, there is provided a mould having a top half 1, a bottom half 2 a sole plate 3 which includes an injection orifice 4, and a last 5. The sole of the shoe is shown at 6 and the strap thereof at 7. A cavity 8 is provided in the mould top half 1 and has a base 9 from which extends a narrow bore 10 to an opening 11 in the wall of the mould cavity defining the strap 7, said opening being positioned in that region in the mould cavity which is the last to become filled in the moulding operaiton. In the present example it will be seen that the point 11 is distant from the injection opening 4 and is located slightly above the plane of division of the top and bottom mould parts. The precise location of the point 11 is conveniently determined experimentally by moulding a series of similar articles with progressively reduced injection periods and examining the products until one or more articles are obtained which are incompletely moulded, the defective portion of the article then indicating the region in question. The bore is preferably drilled and is of any suitable diameter, e.g. $\frac{1}{16}''$. A steel pin 12 having a head 13 is slidably fitted into the bore 10. An electrical switch 14 of the micro type is mounted in the cavity 8, and its operative member 15 is arranged in engagement with the head 13 of the pin so that the switch will be actuated by outward displacement of the pin 10 in response to pressure in the mould cavity when the injected material reaches the region of the point 11.

Referring to FIGURE 3, the mould 1, 2, is carried by a rotatable mould table 16 which is mounted on a carriage C capable of lateral movement towards an injection mechanism or cylinder 17 having an injection nozzle 18 so as to bring the injection nozzle 18 into pressure sealed engagement with mould orifice. The mould table 16 and carriage C are of the type shown in French Patent No. 1,128,105. The circuit of the micro switch 14 previously described is connected through a contact 19 on the table 16 (or on the mould) which is arranged to make with a second contact 20 on the frame 21 of the injection mechanism 17 when the mould is displaced towards the latter. The circuit including the aforesaid contacts also includes an adjustable time delay device 22, and suitable relay or contactor gear, indicated at 23, for interrupting the drive indicated at 24, which operates the injection mechanism 17.

The arrangement is such that in an injection cycle, movement of the mould 1, 2 towards the injection nozzle closes the contacts 19, 20 and thereby places the micro switch in circuit with the relay or contactor gear 23 controlling operation of the injection mechanism. Upon engagement of the injection nozzle with the mould orifice injection takes place, and when the injected plastic material has completely filled the mould the pressure created in the region of the bore 10 forces the pin 12 outwardly to actuate the micro switch 14, and this action causes operation of the relay or contactor gear 23, to disengage the drive 24 and interrupt the further injection of material into the mould. After separation of the mould from the injection mechanism the operations are repeated with a fresh mould.

If it should be necessary or desirable to supply further material to the mould after the control pin 12 has operated, for example to give a degree of mould packing to avoid shrinkage, the time delay device 22 can be adjusted so as to increase the injection period to the desired extent. It will be understood that the time delay device 22 affords an adjustable delay between actuation of the micro switch 14 and interruption of the injection operation. Thus if the device 22 is set at two seconds for example, injection will stop two seconds after operation of the micro switch.

A modified arrangement of the control pin including a spring return is shown in FIGURE 4. The bore 10 is formed with a counterbore 25, and the pin 12 has a flange 26 loaded by a spring 27 which bears against a retaining cap 28. The operation of the device is otherwise as previously described. Other forms of spring loading of the pin 12, as for example by a resilient or spring lever between the head of the pin and the operative member of the micro switch, may obviously be employed.

When applying the invention to moulds of complicated shape there may be some uncertainty as to the most appropriate location of the pressure responsive means under changing mould conditions. In such circumstances it may be desirable to provide more than one pressure responsive means and associated micro switch, the circuit being so arranged that injection is interrupted when all the micro switches have closed. Also the pressure responsive means may be located in the mould cavity at a region other than the last to be filled.

Whilst it is probable that the invention can be most advantageously applied to moulds having mechanical locking devices, i.e. relatively low pressure moulds, it may also be used with high pressure moulds which are held closed by hydraulic clamping means for example. For such applications the displaceable pin described above would be replaced by some other pressure responsive means suited to high pressures, e.g. a form of pressure sensitive electrical device in an appropriate control circuit.

The invention is not restricted to the examples described above, since details of the arrangement and operation of the injection apparatus may be widely varied.

I claim:

1. Apparatus for injection moulding of plastic material comprising injection means and a cavity mould, means for operating said injection means, means located in the mould cavity responsive to pressure of plastic material in the mould cavity, said pressure responsive means being positioned in the mould cavity at that region thereof, determined by previous trial, which is the last to be filled during the moulding operation and being arranged to respond upon complete filling of the cavity, and means controlled by said pressure responsive means for interrupting operation of the injection means and including a time delay device providing an interval between the response of the pressure responsive means and interruption of operation of the injection means such as to effect further packing of the plastic material in the mould cavity so as to prevent shrinkage of the moulded article.

2. Apparatus according to claim 1 in which the pressure responsive means comprises a displaceable pin located in a bore extending through the mould wall from said region of the cavity and displaceable by pressure of plastic material in the completely filled cavity, electrical switch means actuated by displacement of said pin, and a circuit controlled by said switch means for interrupting operation of the injection means.

3. Apparatus according to claim 1, in which the injection means comprises an injection cylinder having an injection nozzle, and the mould includes an injection orifice engageable by said nozzle, and including means for effecting relative displacement between the injection cylinder and the mould to engage and disengage the nozzle and mould orifice, an electrical circuit controlling injection by the injection cylinder, and switch contacts associated respectively with the injection cylinder and the mould, said switch contacts being included in the control circuit and being arranged to close only when the injection nozzle and the mould are relatively displaced towards engaging position.

4. Apparatus according to claim 1, in which the pressure responsive means comprises a pin displaceable in a bore extending through the mould wall, and a spring for returning said member after displacement thereof.

5. Apparatus according to claim 1, in which the pressure responsive means comprises a pin displaceable in a bore extending through the mould wall, further comprising a cavity open to the exterior of the mould wall and communicating with the outer end of said bore, and a micro switch mounted within said cavity and arranged to be operated by displacement of said pin, said micro switch constituting the means for interrupting operation of the injection means.

References Cited in the file of this patent

UNITED STATES PATENTS

| | | |
|---|---|---|
| 2,470,402 | Jobst | May 17, 1949 |
| 2,600,507 | Leahy | June 17, 1952 |
| 2,786,234 | Beyer | Mar. 26, 1957 |
| 2,801,442 | Moslo | Aug. 6, 1957 |
| 2,832,095 | Ashley | Apr. 29, 1958 |